United States Patent [19]

Shintani et al.

[11] Patent Number: 4,658,647
[45] Date of Patent: Apr. 21, 1987

[54] ACCELEROMETER

[75] Inventors: Yasuo Shintani; Kazuhiro Sakuma; Hisashi Yabe; Hirohito Ito, all of Akishima, Japan

[73] Assignee: Japan Aviation Electronic Industry, Ltd., Tokyo, Japan

[21] Appl. No.: 745,642

[22] Filed: Jun. 17, 1985

[30] Foreign Application Priority Data

Jul. 5, 1984 [JP] Japan ............................. 59-137990

[51] Int. Cl.$^4$ ............................................. G01P 15/13
[52] U.S. Cl. .................................................. 73/517 B
[58] Field of Search ........................... 73/517 B, 517 R

[56] References Cited

U.S. PATENT DOCUMENTS 3,702,073 11/1972 Jacobs ................................. 73/517 B
4,049,199 6/1978 Holdren et al. ..................... 73/517 B
4,498,342 2/1985 Aske .................................. 73/517 B Primary Examiner—Stewart J. Levy
Assistant Examiner—John E. Chapman, Jr.
Attorney, Agent, or Firm—Bierman & Muserlian

[57] ABSTRACT

An accelerometer comprises a pair of stators, a permanent magnet arranged within each of the stators, arcuate support portions diametrically opposed to each other on the surface of each stator, a pair of ring members each of which is positioned on the arcuate support portions of a stator, and a support ring with a flapper interposed between the support ring members. The flapper is connected to the supporting ring by two hinge portions. On each side of the flapper is a bobbin on which a coil is wound, the coils being connected to an external circuit. All of the component elements of the accelerometer are constructed and designed so as to avoid stress depending upon a change in ambient temperature.

2 Claims, 11 Drawing Figures $\Delta\theta < \Delta\theta'$

ACCELEROMETER

BACKGROUND OF THE INVENTION

This invention relates to instruments for detecting acceleration on moving objects, and more particularly to a capacitive accelerometer.

It is already well known in the prior art that a capacitive accelerometer consists of a pair of magnetic units and a flapper or pendulum of nonconductive material such as, for example, fused quartz coated with metal, the flapper being interposed between the magnetic units having permanent magnets so as to be displaceable relative thereto. In this capacitive accelerometer, each metal coated surface of the flapper is provided with a coil surrounding one of the permanent magnets. In the operation of the heretofore accelerometers, when acceleration is applied to the accelerator, the flapper will deflect and cause a change in capacitance with respect to each of the magnetic units. This change is modulated and amplified by an external circuit and is fed back to the coils as a direct current. This current gives rise to a force or torque on the flapper for restoring it to a null position. The current required to restore the flapper to the null position is a measure of the acceleration applied to the accelerometer.

Japanese Utility Model Publications No. 52-38218 and No. 52-38219 respectively disclose a capacitive accelerometer of the above type in which the flapper or pendulum is made of conductive material such as, for example, beryllium copper and one end of the flapper is clamped by a pair of ring-like holders.

When the flapper is made of nonconductive material such as fused quartz as mentioned above, it is necessary to coat the surface of the nonconductive flapper with conductive material. Accordingly, the flapper of each of the accelerometers shown in the above publications is made of beryllium copper for avoiding troublesome coating process. The accelerometer must be assembled precisely with great care, which makes it extremely expensive to manufacture. When the flapper is made of metal, the supporting portion of the flapper in contact with metallic holder different in material from the flapper is subjected to thermal stress due to the difference of thermal expansion between the flapper and the holder.

Further, a coil wound on a bobbin made of different material from one of the flapper must be mounted on both sides of the flapper, and the portion of the flapper attached to the bobbin will be subjected to thermal stress as mentioned above and also the flapper will be loaded by conductors for connecting the coils to the external circuit.

In addition to the above, the flapper must be hinged flexibly relative to the holder, and the hinged portion will be subjected to inner mechanical stress on working. This stress is often of disadvantage to performance of the accelerometer.

OBJECTS OF THE INVENTION

In view of the foregoing, it is the main object of the invention to provide an accelerometer whose accuracy and performance can be superior to the known ones in said respects, and yet may be manufactured at relatively low cost.

It is another object of the invention to provide an accelerometer in which a flapper or pendulum is made of nonmagnetic metal for removing thermal stress due to the difference of thermal expansion between the flapper and supporting means of the flapper.

It is also an object of the invention to provide an accelerometer in which the flapper does not change in form.

It is a still further object of the invention to provide an accelerometer in which hinge portions of the flapper will not be loaded by conductors connecting coils mounted on the flapper to an external circuit.

It is an object of the invention to provide an accelerometer which is capable of compensating errors which will be unavoidable in assembling the accelerometer.

BRIEF DESCRIPTION OF THE DRAWINGS

These and other objects of this invention will become apparent from the following description taken in connection with the accompanying drawings, in which.

DETAILED DESCRIPTION OF THE INVENTION

Figure 1:
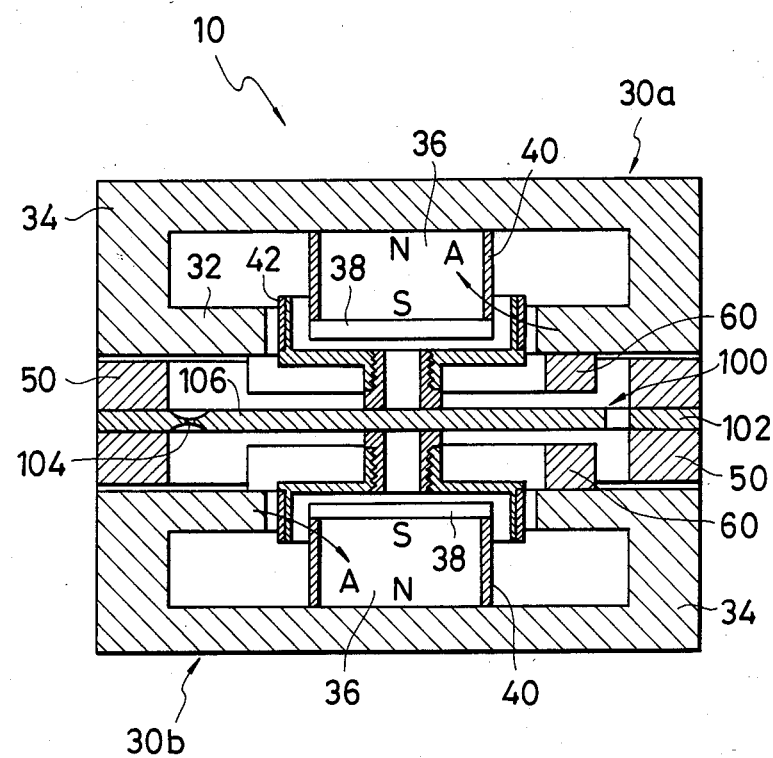
FIG. 1 is a is a vertical sectional view of an accelerometer of this invention.
Figure 2:
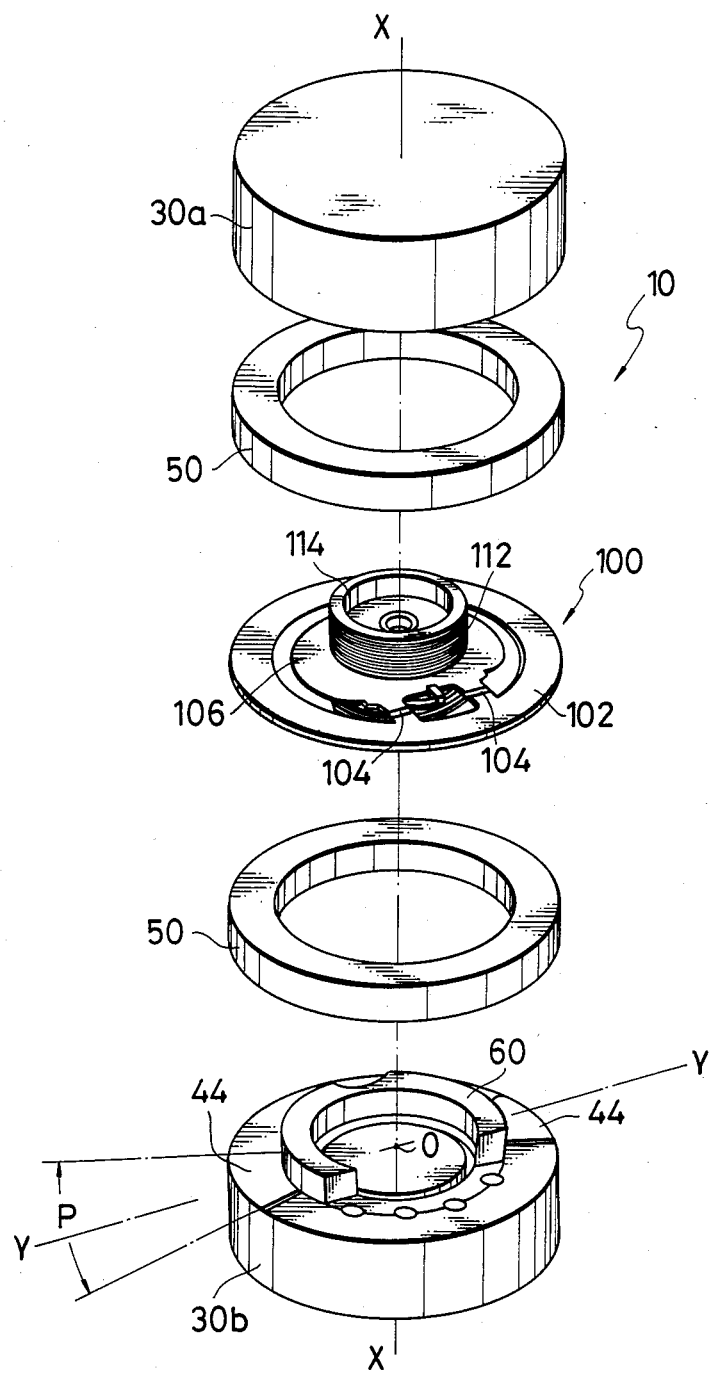
FIG. 2 is an exploded view in perspective of the accelerometer of the invention.

Referring to the drawings, as shown in FIGS. 1 and 2, an accelerometer 10 basically includes a pair of magnetic assemblies 30 and 31 and an intermediate assembly 100 interposed between two magnetic assemblies.

It should be noted at this time that each of the above assemblies is a cylindrical body and a center line X—X passing through these assemblies is parallel to the direction of acceleration to be measured.

The magnetic assemblies 30 and 31 are identical and each of the assemblies 30 and 31 is composed of a stator 34 having an annular collar 32 protruded inwardly from an open end thereof and a permanent magnet 36 mounted therein. The stator 34 is made of highly magnetically permeable iron-base alloys containing nickel. The pair of the permanent magnets 36 are arranged with poles of the same polarity directed towards one another as shown to produce differentially directed electric fields as shown by arrows "A" in FIG. 1. Each magnet 36 is provided with pole piece 38 and preferably surrounded by a shunt member 40 of ferric alloy for compensating for any change of magnetic flux due to a change of temperature. A narrow air gap 42 is formed between the annular collar 32 and the magnet 36 so as to pass magnetic flux through the air gap as shown in FIG. 1.

The intermediate assembly 100 is made of nonmagnetic metal such as cobalt nickel alloy having a high elasticity by nature so as to form a supporting ring 102 and a flapper or pendulum 106 flexibly hinged by two hinge portions 104 to the supporting ring 102. The flapper 106 and the supporting ring 102 are constructed in one piece.

The thickness of the flapper 106 is the same as that of the supporting ring 102 and the shape of the flapper 106 is substantially circular except for the portions adjacent to the pair of hinge portions 104. The flapper 106 is separated from the supporting ring 102 by a small space 108.

Figure 3:
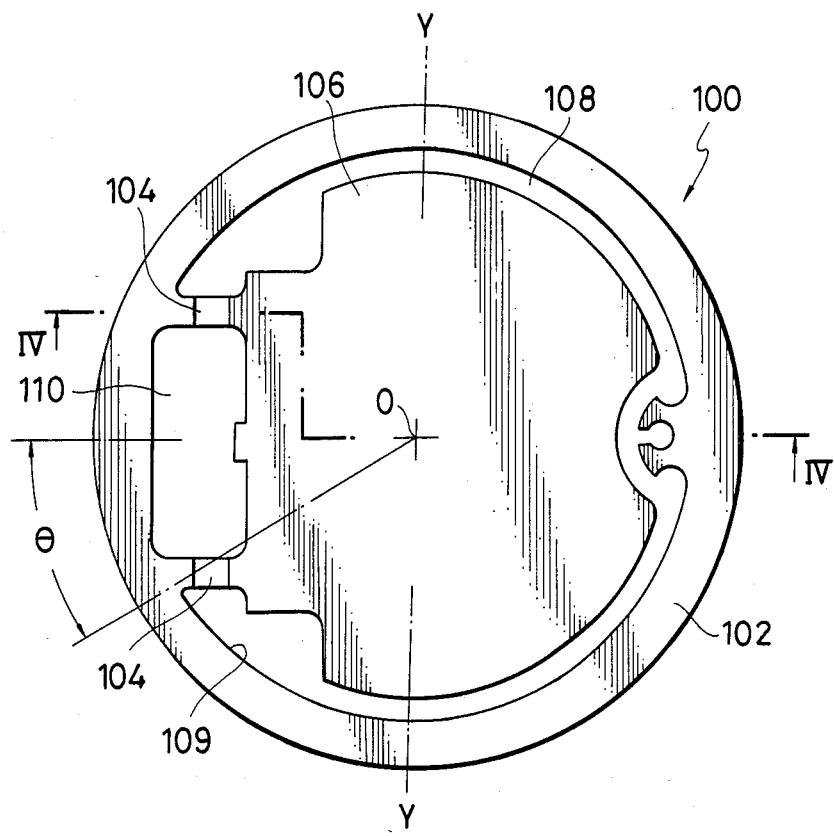
FIG. 3 is a plan view illustrating a flapper and a support ring.
Figure 4:
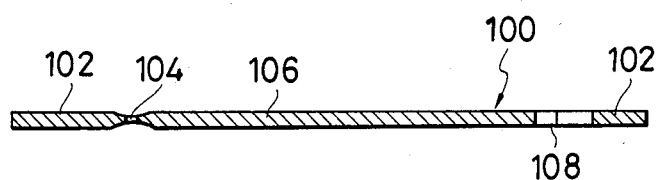
FIG. 4 is a cross sectional view taken in the direction of the arrows substantially along line IV—IV in FIG. 3.

A disc of high elastic nonmagnetic metal is shaped to form the flapper 106 as shown in FIG. 3 and it is preferable that each of the hinge portions 104 is formed at the intersection of an inner periphery 109 of the supporting ring 102 in a line making an angle of 23 degrees with respect to a center line intermediate hinge portions and passing through a center "O" of the disc. The hinge portions 104 may be grooved from the disc. It is preferable to form a cut-out portion 110 between the pair of hinge portions 104 so as to facilitate the arrangement of electric connections.

Mounted on each of surfaces of the flapper 106 is a bobbin 114 on which torque coil 112 is wound. In the prior art, the bobbin is made of aluminium because it is nonmagnetic nature and may easily be coated with insulator. When a bobbin of aluminium is directly attached to the flapper 106 of a high elastic nonmagnetic metal, the accelerometer could cause error in measurements due to the difference expansion between the flapper and the bobbin in thermal expansion.

Consequently, according to the present invention, the bobbin 114 is mounted on a support member 116 which is made of the same material or a material having the same thermal expansion coefficient as the flapper 116, and the support member 116 may be fixed to the flapper by suitable means such as, for example, adhesive.

The terminal end 118 of each coil 112 is connected to a conductor 122 at a short rod member 120 of insulator located in a center of the cut-out portion 110 for connecting the coil 112 with the external electric circuit.

Figure 5:
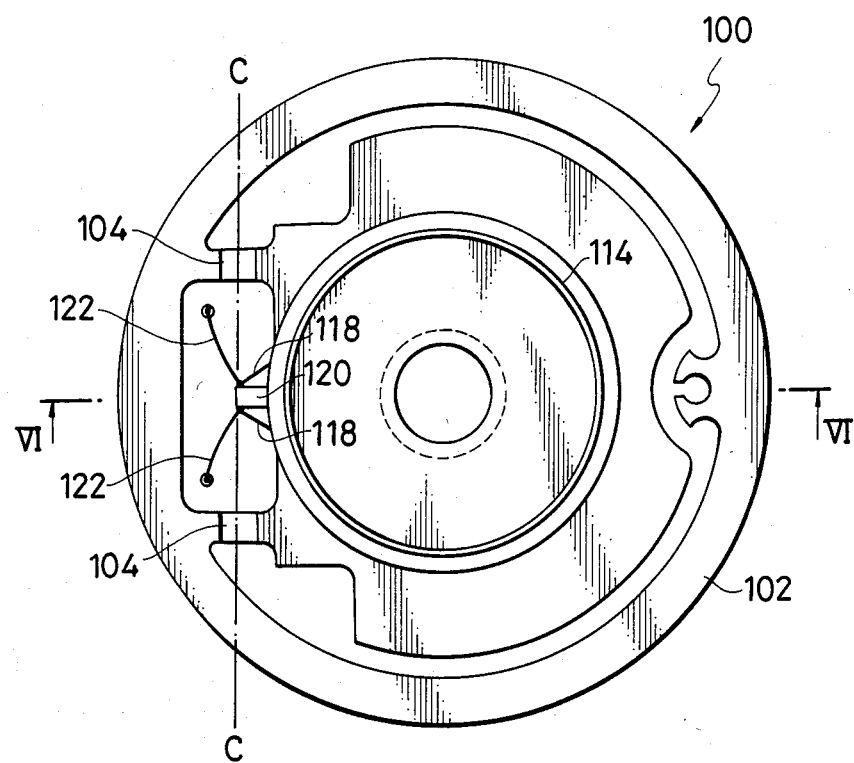
FIG. 5 is a plan view of an intermediate magnetic assembly.
Figure 6:
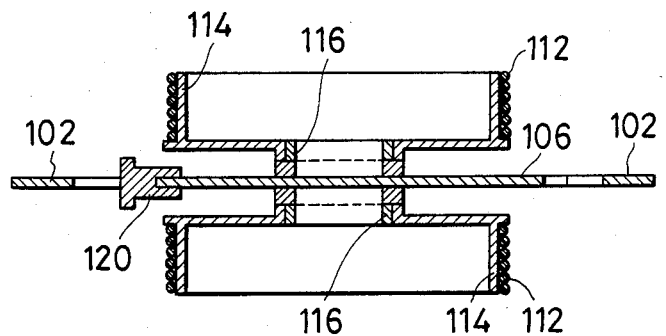
FIG. 6 is a sectional view taken on line VI—VI in FIG. 5.

As shown in FIG. 5, the connecting portions of the end 118 of each coil with a conductor 122 is positioned in a center line C—C passing through two hinge portions 104 so that when the flapper 106 vibrates about the center line C—C of the hinge portion 104, the flapper 106 will not be loaded by the conductor 122.

The intermediate assembly 100 is interposed between two holding rings 50 made of the metal which is the same as one of the flapper 106 or as the thermal expansion as the flapper 106. The intermediate assembly 100 sandwiched in the pair of holding rings 50 is positioned between the pair of the magnetic assemblies 30 and 31 for avoiding errors due to the difference between the intermediate assembly and the magnetic assemblies in thermal expansion.

For the purpose of avoiding direct contact between the annular collar 32 of each stator 34 of the magnetic assemblies 30$_a$ and 30$_b$ and the adjacent holding ring 50, a pair of raised lands or arcuate supports 44 are formed on the collar 32 of each stator 34 on a line Y—Y perpendicularly intersecting the line passing through the center "O" of the flapper 106 and the center line passing through the post 120 and the center "O" of the flapper.

The ends of each raised land 44 are defined at a desired angle "P" with respect to the line X—X and the angle "P" is preferably about 42°.

Mounted on the annular collar 32 of each stator 34 within the pair of the raised lands 44 is a U-shaped pickoff member 60 which is made of an insulating material such as ceramics and is coated with a layer of metal of, for example, nickel. The metal layer on the pick-off member 60 is connected by appropriate conductors to an outer electric circuit so as to form capacitance with respect to the metal flapper 106 connected to earth. The movement of the flapper 106 may be taken out electrically as the change of capacitance. As stated above, the flapper 106 is made of metal, and it is easily connected to earth by connecting a lead to the supporting ring 102. Accordingly, the flapper 106 will not be loaded mechanically or physically in connecting the earth to the flapper 106.

Figure 7:
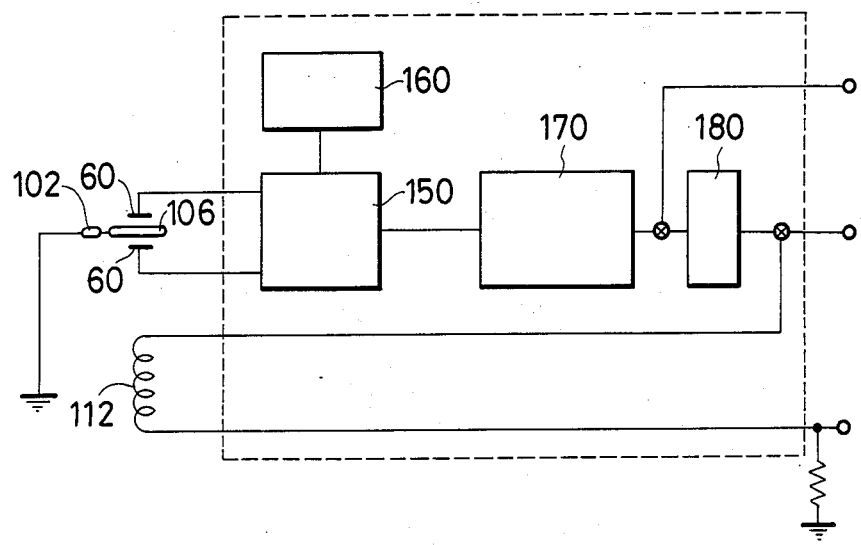
FIG. 7 is a schematic circuit diagram of the accelerometer of this invention.

The electrical circuit of the accelerometer 10 is shown in FIG. 7. As stated above, the flapper 106 is connected to earth through the supporting ring 102 and a pair of pickoff members 60 are connected to a position detector and amplifier 150. The position detector and amplifier 150 is connected to a detector driving circuit 160 and a compensator 170. The compensator 170 is connected through an amplifier 180 to a torque coil 112.

A pair of permanent magnets 36 may create magnetic flux and put the flapper 106 in its neutral position.

When the pair of hinge portions 104 connecting the flapper 106 to the supporting ring 102 are formed as by means of electric discharge machining, the flapper 106 will deflect from its neutral position due to the stress in machining. It is impossible to remove such stress in assembling of the accelerometer, and it will lead to noticeable errors in measurement of acceleration. That is, an erroneous output caused by the above deflection of the flapper 106 will be sensed as "bias".

The above deflection of the flapper 106 of the can be corrected. The flapper 106 is made of nonmagnetic metal. Nevertheless it will have a very week magnetic property because of impurities contained therein.

Figure 8:
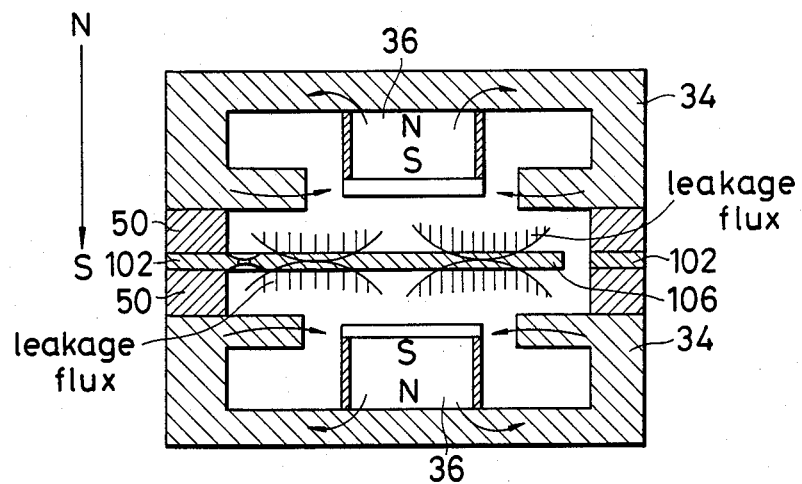
FIG. 8 is a schematic view illustrating the compensation of the accelerometer of this invention.

When the flapper 106 is deflected downwardly from the hinged portion 104 for example, the accelerometer 10 is immersed in a magnetic field shown by an arrow N-S in FIG. 8. Then the lower permanent magnet 36$b$ will be demagnetized, and the magnetic flux of the upper magnet 36$a$ will increase over that of the lower magnet 36$b$. Consequently, the flapper 106 receives torque for moving it upwardly from the hinge portions 104, and the deflection of the flapper may be corrected. The strength of the magnetic field to be applied for correction of the deflection of the flapper 106 may be selected by the amount of the deflection.

As will be understood from the foregoing, the construction elements of the accelerometer 10 of the present invention will not be deformed by mechanical stress resulting from the difference in material. Further, it is possible to minimize the creeps resulting from the stress of each of the hinge portions 104 because the flapper 106 and the supporting ring 102 are formed in one body and made of nonmagnetic metal, especially cobalt-nickel alloy.

Figure 9:
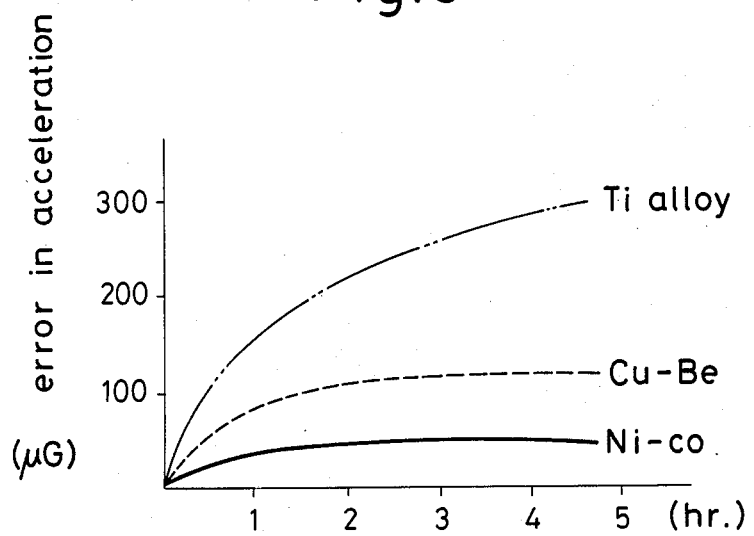
FIG. 9 is a diagram illustrating creep error of the flapper of the accelerometer of the present invention in comparison with one of the other flapper when using different materials for the flapper.

In tests, flappers were made of cobalt-nickel alloy, titanium alloy and beryllium alloy under the same conditions, and each of these flappers was assembled to form the accelerometer. Each of the accelerometer was tested at a temperature of 65° C. FIG. 9 shows the relation between error and time of these accelerometers and the accelerometer with the flapper of nickel-cobalt alloy is superior to the accelerometers with the flappers of titanium alloy or beryllium alloy in creep characteristics.

According to the present invention, the holding ring 50 is supported by two raised land portions 44 on the collar 32 of each of the stators 34, and any thermal stress occuring between the stator 34 and the supporting ring 50 will easily be released.

Figures 10A, 10B:
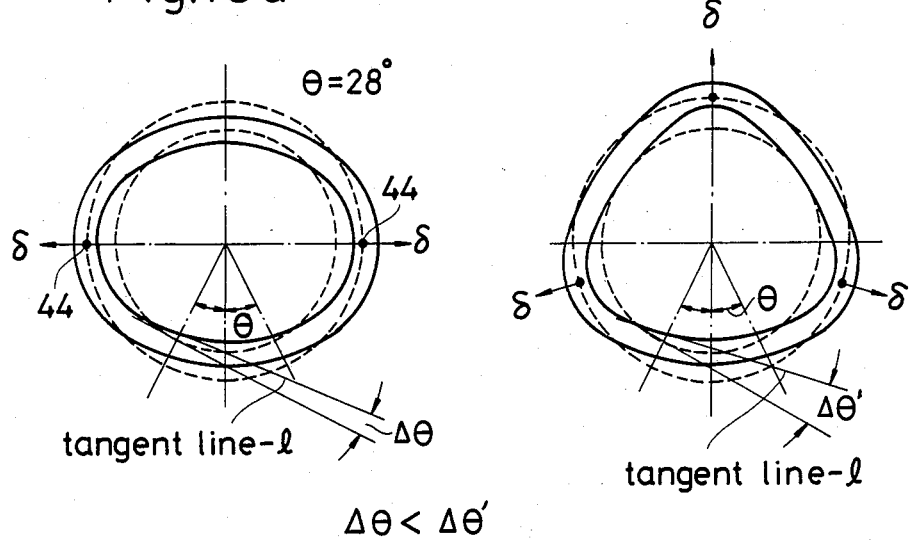
FIG. 10a is a schematic diagram illustrating the the flapper according to the invention in which the holding ring of the flapper is supported at two portions.
FIG. 10b is a schematic diagram of the holding ring of the flapper supported at three portions.

When the flapper 106 is supported by two raised land portions 44 and each of the hinge portions 104 of the flapper 106 is positioned on the line at an angle of 28° with respect to the center line Y—Y passing through the raised land portions 44, an angle of inclination of a tangent line "1" which touches at the hinge portions 104 changes more slightly, as shown in FIG. 10a, than when the flapper is supported by three points, as shown in FIG. 10b.

According to the present invention, the accelerometer 10 has very excellent effects on the accuracy of the results by reason of the fact that the parts constituting the intermediate assembly 100 and the support member 116 of the bobbin 114 are made of a metal which is the same as or has the same thermal expansion coefficient as the material of the flapper 106 and the connecting pint of the conductors 122 the ends 112 are positioned in a center line C—C of the hinge portions 104.

While the invention has been described in its preferred embodiment, it is to be understood that modifications will occur those skilled in the art without departing from the spirit of the invention. The scope of the invention is therefore to be determined solely by the appended claims.

What is claimed is:

1. An accelerometer comprising: a magnetic assembly having a first stator and a second stator; a pair of diametrically opposed arcuate support portions formed on a surface of each of said first and second stators; a pair of ring members each arranged in contact with said support portions of one of said stators; acceleration detecting means comprising a flapper made of cobalt-nickel alloy and a support ring member of non-magnetic metal, said support ring member being mounted between said ring members, said flapper being connected by two spaced hinge portions to said support ring member, and a bobbin having a coil wound thereon mounted on each opposed surface of the flapper, said bobbins being mounted on a support of the same material as or a material having the same coefficient of expansion as that of said flapper, each said coil being connected to a conductor of an external circuit at a portion on a transverse center line extending through the center of each of said two hinge portions; and a permanent magnet and a U-shaped pickoff means attached to each of said stators, said magnets being arranged so that poles of the same polarity are directed towards one another.

2. An accelerometer as claimed in claim 1 in which said support ring member is made of cobalt-nickel alloy.

* * * * *